United States Patent
Huke et al.

(10) Patent No.: US 11,393,295 B2
(45) Date of Patent: Jul. 19, 2022

(54) IN-PLAY WAGERING THROUGH A FANTASY SOFTWARE APPLICATION

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/083,786

(22) Filed: Oct. 29, 2020

(65) Prior Publication Data
US 2022/0122421 A1 Apr. 21, 2022

Related U.S. Application Data

(60) Provisional application No. 63/092,637, filed on Oct. 16, 2020.

(51) Int. Cl.
G07F 17/32 (2006.01)
A63F 13/828 (2014.01)

(52) U.S. Cl.
CPC ........ *G07F 17/3288* (2013.01); *A63F 13/828* (2014.09); *G07F 17/3227* (2013.01)

(58) Field of Classification Search
CPC . G07F 17/3288; G07F 17/3227; A63F 13/828
See application file for complete search history.

(56) References Cited

U.S. PATENT DOCUMENTS

| | | | | |
|---|---|---|---|---|
| 8,538,563 B1* | 9/2013 | Barber | ............... | G07F 17/3288 700/91 |
| 9,367,996 B2 | 6/2016 | Scalise | | |
| 10,046,243 B2 | 8/2018 | Arnone et al. | | |
| 10,332,354 B2 | 6/2019 | Amaitis et al. | | |
| 2004/0117831 A1* | 6/2004 | Ellis | ............... | H04N 21/485 725/53 |
| 2011/0281620 A1* | 11/2011 | Hays | ............... | G07F 17/3288 463/2 |
| 2012/0009984 A1* | 1/2012 | Amaitis | ............... | G07F 17/3274 463/4 |
| 2012/0142411 A1* | 6/2012 | Thompson | ............... | A63F 13/35 463/25 |
| 2014/0302914 A1* | 10/2014 | Weinstein | ............... | G07F 17/3288 463/25 |
| 2016/0042612 A1* | 2/2016 | Scalise | ............... | G07F 17/3288 463/25 |
| 2017/0098348 A1* | 4/2017 | Odom | ............... | G07F 17/3288 |
| 2019/0066451 A1 | 2/2019 | Galfond et al. | | |

OTHER PUBLICATIONS

Notification of Transmittal of the International Search Report and the Written Opinion of the International Searching Authority, or the Declaration dated Oct. 21, 2021, in connection with corresponding International Application No. PCT/US2021/052829; 8 pages.

* cited by examiner

*Primary Examiner* — Corbett B Coburn
(74) *Attorney, Agent, or Firm* — Maier & Maier, PLLC

(57) ABSTRACT

A system for wagering on sub-outcomes of a live sporting event through a fantasy sports network, in which the wagers displayed for the user are related to the makeup of the user's fantasy roster.

17 Claims, 3 Drawing Sheets

Content - High Level Diagram

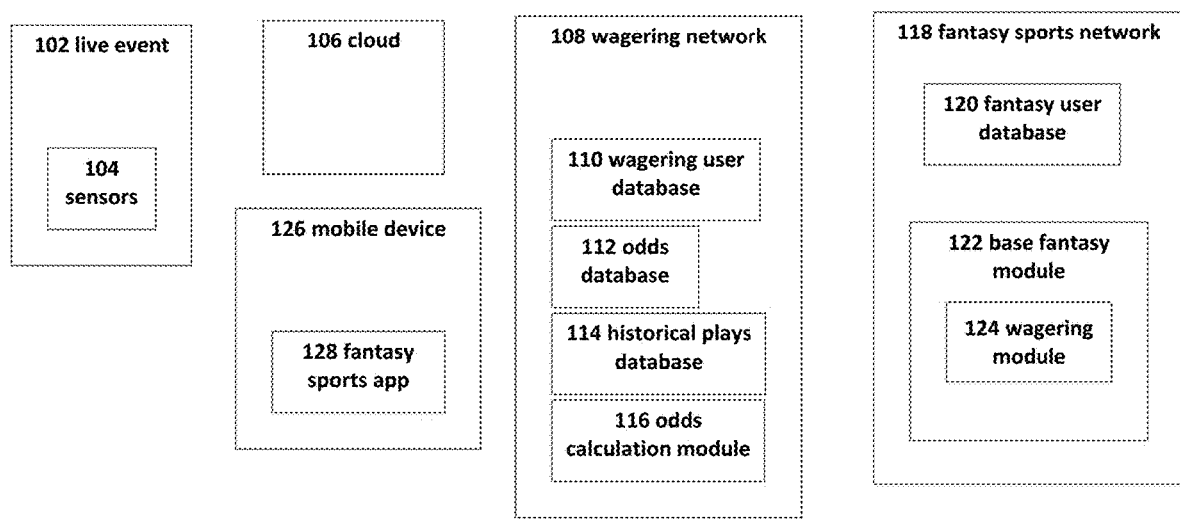
Fig.1 Content - High Level Diagram

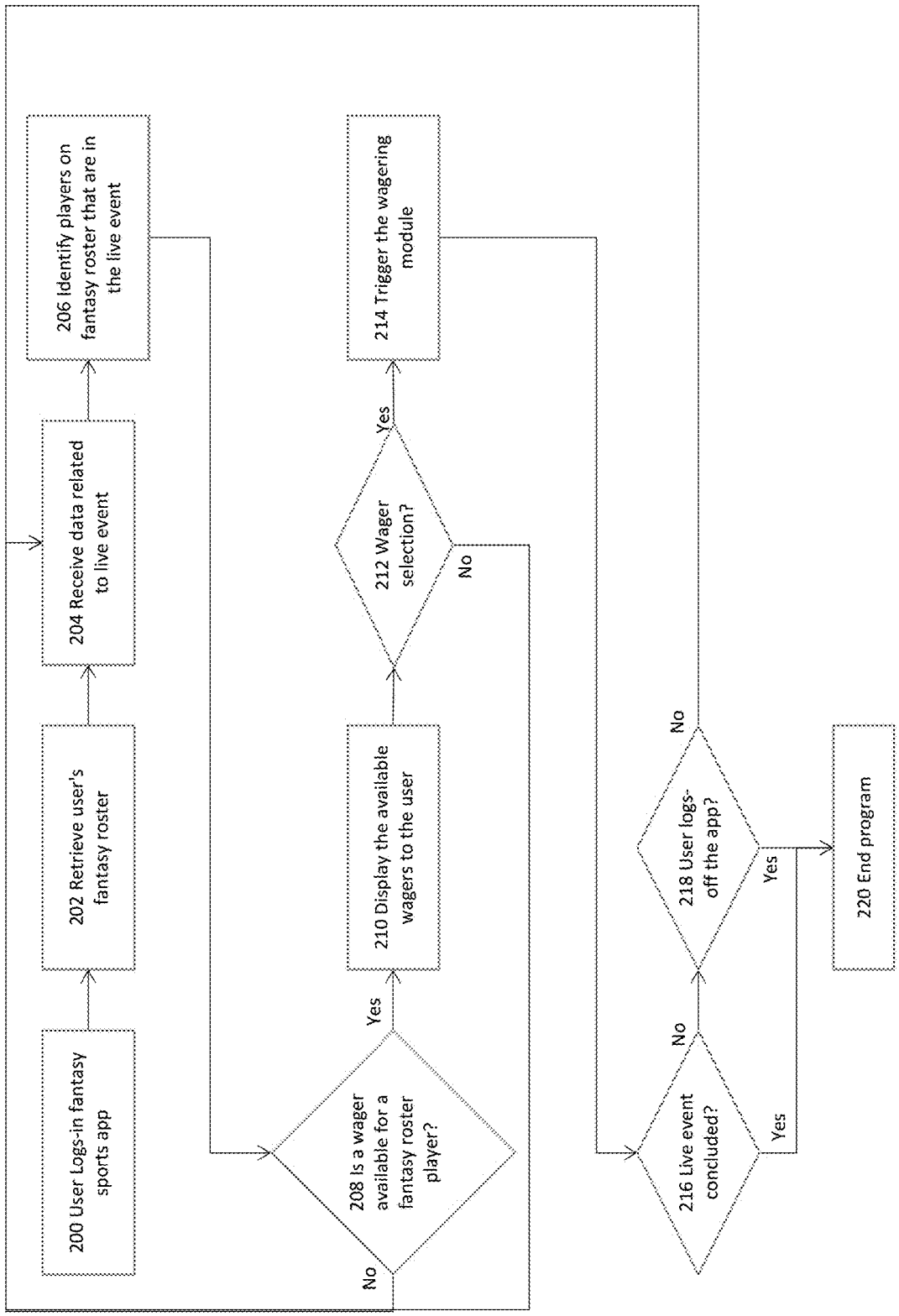
Fig.2 base fantasy module Object Content

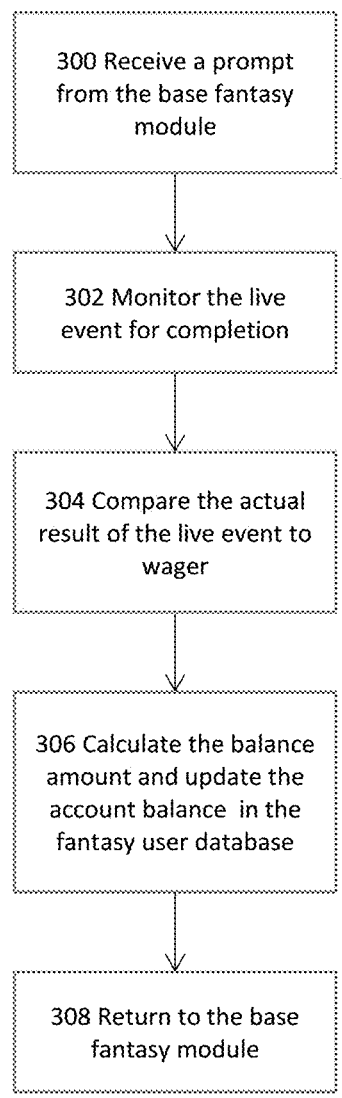
Fig.3 wagering module Object Content

IN-PLAY WAGERING THROUGH A FANTASY SOFTWARE APPLICATION

FIELD

The embodiments are generally related to wagering on micro markets and sub outcomes of live sporting events and integrating that wagering with fantasy sports.

BACKGROUND

With the U.S. Supreme Court invalidating the 1992 Professional and Amateur Sports Protection Act, legalizing sports gambling, there will be a proliferations of online platforms that allow users to wager on sports through their mobile devices.

Fantasy sports have become a multibillion-dollar industry that has provided an indirect way for users to wager on sports. With the path to broader access to legal sports gambling, fantasy sports platforms will be seeking ways to integrate those options in order to retain their customer base.

SUMMARY

The embodiments include methods, systems and apparatuses for wagering in real time on single plays in sporting events through a fantasy sports software application. One embodiment includes a system for wagering on single plays inside of a live sporting event through a fantasy sports platform, including a fantasy sports network, a connection to a wagering network; at least player on a roster of players active in at least one live sporting event on the fantasy sports network, the roster of players selected as a fantasy team in the fantasy sports network, and one or more available singled play wagers from the wagering network on players that are on the roster of players are provided through the fantasy sports network, the available wagers from the wagering network determined by a comparison of the players on the roster of players with data received from the at least one live sporting event.

Another exemplary embodiment includes a method of wagering on single plays inside of a live sporting event through a fantasy sports platform, including executing on a processor the steps of displaying a fantasy sports app; displaying one or wagers accessible in the fantasy sports app, wherein the one or more wagers are real time single play wagers; displaying a roster of players active in one or more live sporting events, the roster of players selected as fantasy team in the fantasy sports app; and displaying one or more wagers available to be placed on at least one player of the roster of players active in the one or more live sporting events.

Still another embodiment includes a system for wagering on single plays inside of a live sporting event through a fantasy sports platform, including a wagering network, a connection to a fantasy sports network a roster of players active in at least one live sporting event on the fantasy sports network, the roster of players selected as a fantasy team in the fantasy sports network, and one or more available wagers from the wagering network on players that are on the roster of players are provided through the fantasy sports network, the available wagers from the wagering network determined by a comparison of the players on the roster of players with data received from the at least one live sporting event.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a system for in-play wagering through a fantasy sports software application, according to an embodiment.

FIG. 2 illustrates a base fantasy module, according to an embodiment.

FIG. 3 illustrates a wagering module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for in-play wagering through a fantasy sports network. This system is comprised of a live event 102, for example, a sporting event such as an American football game, a basketball game, a hockey game, a tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round-robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such an injury to an important player such as a listed pitcher, in which a sportsbook, casino or racino will take an available wager off the board. As the line moves there becomes an opportunity for a bettor to bet on both sides at different point spreads to middle and win both bets. Sportsbooks will often offer bets on portions of games, such as first half bets and half-time bets. Additionally, the sportsbook can offer futures bets on live events 102 in the future. Sportsbooks need to offer payment processing services to cash out customers. This can be done at kiosks at the live event 102 or another location. For example, considering a live event 102 being an American football game that is played between the Philadelphia Eagles and the New England Patriots, at Lincoln Financial Field, Philadelphia.

Further, embodiments may include a plurality of sensors 104 that may be used such as motion sensors, temperature sensors, humidity sensors, cameras such as an RGB-D camera which is a digital camera capturing color (RGB) and depth information for every pixel in an image, microphones, radiofrequency receiver, a thermal imager, a radar device, a LIDAR device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that collects statistical information through real-time X, Y positioning of players and X, Y, Z positioning of the ball. In the example of American football game, the plurality of sensors 104 may be used for capturing parameters such as player acceleration, player speed (2 sensors on shoulders of the player and 1 sensor on player's helmet), goal line, and quarterback ball velocity.

Further, embodiments may include a cloud 106 or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real-time analysis on the type of play and the result of the play. The cloud 106 may also be synchronized with game situational data, such as the time of the game, the score, location on the field, weather conditions, and the like which may affect the choice of play utilized. For example, in other embodiments, the cloud 106 may not receive data gathered from sensors 104 and may, instead, receive data from an alternative data feed, such as SportsRadar®. This data may be compiled substantially immediately following the completion of any play and the data from this feed may be compared with a variety of team data and league data based on a variety of elements, including possession, score, time, team, and so forth, as described in various embodiments herein.

Further, embodiments may include a wagering network 108 which may perform real-time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other embodiments, the wagering network 108 may not receive data gathered from sensors 104 and may, instead, receive data from an alternative data feed, such as SportsRadar®. This data may be compiled substantially immediately following the completion of any play and the data from this feed may be compared with a variety of team data and league data based on a variety of elements, including possession, score, time, team, and so forth, as described in various embodiments herein. The wagering network 108 can offer a number of software as a service managed services such as, user interface service, risk management service, compliance, pricing and trading service, IT support of the technology platform, business applications, game configuration, state-based integration, fantasy sports connection, integration to allow the joining of social media, as well as marketing support services that can create engaging promotions to the user. In one embodiment, the wagering network 108 may facilitate the user with settlement options related to the wager. In another embodiment, the wagering network 108 may use third party balance settlement apps linked to a fantasy sports software application (or fantasy sports app) 128, for settlement of the balances of the user. For example, Draftkings® app may use PayPal for settlement of the balances of the user.

Further, embodiments may utilize a wagering user database 110 which contains data relevant to all users of the wagering network 108, which may include, a user ID, a device identifier, and wagering history. The wagering user database 110 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the wagering user database 110 may contain betting lines and search queries. The wagering user database 110 may be searched, based on a search criteria received from the user. Each betting line may include a plurality of betting attributes such as at least one of the live event 102, a team, a player, an amount of wager, etc. The wagering user database 110 may include information related to all the users involved in the live event 102. In one example embodiment, the wagering user database 110 may include information for generating a user authenticity report and a wagering verification report. Further, the wagering user database 110 may be used to store user statistics like, but not limited to, retention period for a particular user, frequency of wagers placed by a particular user, average amount of wager placed by each user, etc.

Further, embodiments may utilize an odds database 112 that contains the odds calculated by an odds calculation module 116. The odds database 112 stores all the odds and may be used by the fantasy sports network 118 to facilitate the user with wagering opportunities, through the fantasy sports app 128. In one embodiment, the type of wagering may depend on the type of game being played.

Further, embodiments may utilize a historical plays database 114 that contains play data for the type of sport being played in the live event 102. In one embodiment, for optimal odds calculation, the historical play data should include metadata about the historical plays, such as time of the live event 102, location, weather, previous plays, opponent, physiological data of the players (including blood pressure, pulse rate, and respiration rate), completed passes by all players, information related to the players such as injuries in the past, touchdowns, player speed, player acceleration, catch probability, information related to trainers of each player, etc. For example, in the American football game, information stored in the historical plays database 114 may include information related to the previous American football games played by the Philadelphia Eagles such as, but not limited to, the weather condition, i.e. during the match, it was cloudy.

Further, embodiments may include an odds calculation module 116 which utilizes information from historical plays database 114 and the information from the sensor feeds 104 to calculate odds for in-play wagers. The information from the historical plays database 114 may include data related to the type of the play, the previous information related to players involved in the live event 102, and results of the previous live events 102. The odds for each live event 102, such as in an American football game, a particular player scoring a touchdown, completing a pass, or number of picks, may be calculated based on the information received from the sensor feeds 104 and the previous information related to the particular player. Further, the odds may be updated based on in-game events (for example, a player completing a pass against a particular opponent team, increases the odds of completing the pass against the same opponent team). The odds may be calculated or adjusted based on statistical information related to the live event 102 and the statistical information of the players. For example, the odds may be determined based on the historical data such as prior performance information about a player (like percentage of completed passes, average number of touchdowns, picks in a game), and physiological information of player(s) etc., and current i.e. real-time information, such as current confidence level etc. In one embodiment, the type of wagering may depend on the type of game being played. In one embodiment, the odds calculation module 116 may determine the available wagers to the user. The odds calculation module 116 may also utilize a probability engine, which assembles all the historical data and real-time data and produces the odds (stored in the odds database 112) for in-play wagers. Thus, the odds calculation module 116 information relevant to all the potential outcomes, as available wagers, which facilitates the user with a better knowledge to make certain judgements about the potential performance of players in each live event 102 and place a calculated wager with a potential return on the wager. For example, in American football game, the odds calculation module 116 may calculate odds related to the possible outcomes of Alshon Jeffrey (wide receiver) for Philadelphia Eagles against New England Patriots, scoring a touchdown are 4/1 (in moneyline +400), completing a pass are 5/1, and scoring a successful kick are 3/1.

Further, embodiments may include a fantasy sports network 118 which may perform the real-time analysis of each play related to a fantasy sport, in a fantasy sports app 128 and the result of a play or action. The fantasy sport may correspond to the live event 102 i.e. a type of game, played via the internet, where users assemble imaginary or virtual teams of real players of a sport, for example, related to the live event 102. The virtual teams may compete based on the statistical performance of the player in the live event 102. Further, the performance of players may be converted into points, that are compiled and totaled according to a fantasy roster selected by the user. The fantasy sports network 118 may be synchronized with the live event 102 to track each live event 102 or the whole season related to the live event 102. Further, the fantasy sports network 118 may be synchronized with game situational data, such as the time of the game, the score, location on the field, weather conditions, and the like which may affect the choice of play utilized. Further, the fantasy sports network 118 may be synchronized with the wagering network 108. For example, in one embodiment, the fantasy sports network 118 may receive data gathered related to the players involved in the live event 102, from the wagering network 108. This data may be compiled substantially immediately following the completion of any play and the data from this feed may be compared with a variety of team data and league data based on a variety of elements, including possession, score, time, team, and so forth, as described in various exemplary embodiments herein. Further, the fantasy sports network 118 may include settlement options related to settling the user's wagers upon completion of the live event 102. In one embodiment, the fantasy sports network 118 may settle the balances of the user. In another embodiment, the fantasy sports network 118 may use third party balance settlement apps linked, via the fantasy sports network 118, to the fantasy sports app 128. For example, Draftkings® app may use PayPal for settlement of the balances of the user.

Further, embodiments may utilize a fantasy user database 120 which contains data relevant to all users of the fantasy sports network 118, which may include, a user's fantasy ID, a device identifier, fantasy wagering history, fantasy rosters created by the user in the fantasy sports app 128, transaction history of the user, live events participated by the user, various contests of the live event 102 joined by the user, and fantasy wallet information of the user. For example, a fantasy roster for American football game, created by user Casey Huke, may include Alshon Jeffery, Jalen Hurts, and DeSean Jackson from Philadelphia Eagles in the Draftkings® app. In one embodiment, the user may create multiple fantasy rosters for the live event 102. The fantasy user database 120 may also contain a list of user fantasy account records associated with a respective user fantasy ID. For example, a user account record may include information such as user interests, user personal details such as fantasy name of the user, players included in the fantasy roster created by the user, previously played sporting events, highest wager, favorite sporting event, and current user standings and balance corresponding to the user's fantasy ID. In addition, the fantasy user database 120 may contain betting lines and search queries. The fantasy user database 120 may be searched based on a search criteria received from the user. The fantasy user database 120 may include information related to all the users involved in the particular contest of the live event 102, in which the current user is involved. Further, the fantasy user database 120 may be used to store user statistics like, but not limited to, retention period for a particular user on the fantasy sports app 128, contests participated in the fantasy sports app 128, frequency of wagers placed by a particular user, an average amount of wager placed by each user, type of contests played by the user, etc. Further, the fantasy user database 120 may include wallet information of the user. For example, the wallet information may include a user's fantasy ID, a balance amount corresponding to the user's fantasy ID, third party balance settlement apps liked to the fantasy sports app 128. In one embodiment, the fantasy user database 120 may settle balances of the user itself. In another embodiment, the fantasy user database 120 may use third party balance settlement apps linked, via the fantasy sports network 118, to the fantasy sports app 128. For example, Draftkings app may use PayPal for settlement of the balances of the user.

Further, embodiments may include a base fantasy module 122 that allows the user to place in-play wagers. The base fantasy module 122 may allow the user to log-in/sign-in to the fantasy sports network 118 through the fantasy sports app 128 on the mobile device 126, during the live event 102. After logging in to the fantasy sports app 128, the base fantasy module 122 may retrieve user's fantasy roster from the fantasy user database 120. For example, a fantasy roster including Alshon Jeffery, Jalen Hurts, and DeSean Jackson from Philadelphia Eagles in the Draftkings® app, is retrieved from the fantasy user database 120. Further, the base fantasy module 122 may receive data related to the live event 102. For example, the base fantasy module 122 receives data related to the live event 102 that Alshon Jeffery is currently playing. Based on the retrieved fantasy roster and the received live event data, the base fantasy module 122 may identify players on the fantasy roster that are playing in the live event 102. In one example embodiment, the base fantasy module 122 may identify players on the fantasy roster that are on offense, or who are otherwise active or playing, in the live event 102. For example, Alshon Jeffery is a part of the fantasy roster and is active and playing on offense in the live event 102. Based on the identified players on the fantasy roster that are playing in the live event 102, the base fantasy module 122 may determine if a wager is available for the fantasy roster player. In one case, if the wagers are available for the fantasy roster player, then the base fantasy module 122 may display available wagers to the user. In one embodiment, the available wagers may be displayed to the user on the mobile device 126. For example, a wager of $100 is available for Alshon Jeffery, for scoring a touchdown with odds of 4/1. Further, the available wager of $100 for Alshon Jeffery, for scoring a touchdown with odds of 4/1, is displayed to the user Casey Huke. Further, the wager may be displayed in various forms such as, but not limiting to, the player with the available wager can be highlighted, all the players on offense can be highlighted (i.e. considering wager is available for players on offense), or the wagers can be displayed on the player's representation on the user's fantasy roster. In another embodiment, due to limited screen space on the mobile device 126, sub-menus may be displayed on the highlighted player with the available wagers or the highlighted players on offense, to allow for more wagers to be displayed. In another case, if the wager is not available for the fantasy roster player, then the base fantasy module 122 may continue receiving data related to the live event 102. Further, the base fantasy module 122 may check for wager selection. In one case, if the wager is selected by a user, then the base fantasy module 122 may trigger a wagering module 124. For example, the user selects the wager of $100 to be placed on Alshon Jeffery for scoring a touchdown. In another case, if no wager is selected by the user, then the base fantasy module 122 may continue receiving the data related to the live event 102. Thereafter, the base fantasy module 122 may constantly monitor if the live event 102 is concluded or if the user logs-off from the fantasy sports app 128, during the live event 102.

Further, embodiments may include a wagering module 124 which is triggered when a wager is placed by the user in the live event 102, via the base fantasy module 122. After receiving the prompt from the base fantasy module 122, the wagering module 124 may constantly monitor the live event 102 for completion and thereby obtain a result of the live event 102. In one case, when the live event 102 is concluded, then the wagering module 124 may proceed to compare the result of the live event 102 with the wager placed by the user. In another case, when the live event 102 is not concluded, then the wagering module 124 may continue monitoring the live event 102 for completion. Further, the wagering module 124 may compare the result of the live event 102 with the wagers placed by the user, to determine a result of the wager i.e. whether the user has won or lost the wager. Based on the comparison of the result of the live event 102 and the wagers placed by the user, the result of the wager may be used to calculate the balance amount for the user. For example, the result of the live event 102, i.e. Alshon Jeffery of Philadelphia Eagles, playing during 3rd quarter against the New England Patriots scored a touchdown, and the wager of $100 placed on Alshon Jeffery for scoring a touchdown, are compared to determine the result of the wager i.e. a win for the user. In this example, the user would make a profit of $400, as per the initial wager ($100) placed at odds of 4/1. Thus, the updated balance of the user (with an opening balance of $2000), after the completion of the live event 102, will be $2000+$400=$2400. Further, the updated balance of $2400 of the user may be updated in the fantasy user database 120. Further, the wagering module 124 monitors the live event 102, until a predefined condition is met. In one exemplary embodiment, the predefined condition may be that the user has logged out of the live event 102 or the live event 102 has ended. In addition, at the end of the live event 102, the user may be prompted with a message reminder for a next live event, as a recommendation.

Further, embodiments may include a mobile device 126 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional mobile devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also allow storage and/or an installation medium for the computing device. In still other embodiments, the computing device may allow USB connections (not shown) to receive handheld USB storage devices. In further embodiments, an I/O device may be a bridge between a system bus and an external communication bus, e.g. a USB bus, a SCSI bus, a FireWire bus, an Ethernet bus, a Gigabit Ethernet bus, a Fiber Channel bus, or a Thunderbolt bus. Further, the mobile device 126 could be an optional component and would be utilized in a situation in which the paired wearable device is utilizing the mobile device as additional memory or computing power or connection to the internet.

Further, embodiments may include a fantasy sports app 128 which allow the user to log-in/sign-in the fantasy sports app 128, during the live event 102. The fantasy sports app 128 allows the user to make a fantasy roster of players related to the live event 102. In one embodiment, the fantasy sports app 128 may present a number of contests related to a particular live event 102. In an example, for a particular live event 102, the fantasy sports app 128 may present a contest with an entry fee of $9, offering 10 users to play that contest and a winning amount of $80 for the winner. In another example, for the same live event 102, in which the fantasy sports app 128 may present a contest with an entry fee of $100, offering 10 users to play that contest, and a winning amount of $900 for the winner. The user may be able to make a fantasy roster from the teams involved in the live event 102. Further, the user may be asked to prepare the fantasy roster before a predefined time from the start of the live event 102. For example, user Casey Huke creates a roster including Alshon Jeffery, Jalen Hurts, and DeSean Jackson from Philadelphia Eagles in the Draftkings app for the contest with the entry fee of $100. In one embodiment, the fantasy sports app 128 may present the user with the wagers available, related to a particular live event 102, received via the base fantasy module 122. Further, the fantasy sports app 128 may store information related to the rosters created by the user, in the fantasy user database 120. Further, when the live event 102 concludes, the players of the roster created by the user, may be verified, for final settlement on the wager. Based on the verification of the roster and the result of the live event 102, the fantasy sports app 128 may facilitate settlement of balances for the user. In one embodiment, the balances of the user may be updated in the fantasy user database 120. In one embodiment, the fantasy sports app 128 may trigger a third-party balance settlement apps linked to the fantasy sports app 128, for settlement of the balances of the user. For example, Draftkings app may use PayPal for settlement of the balances of the user.

FIG. 2 illustrates the base fantasy module. The base fantasy module 122 is triggered when the user logs-in, at step 200, to the fantasy sports network 118 through an app on the mobile device 126 i.e. fantasy sports app 128. The base fantasy module 122 may facilitate the user to place in-play wagers. After logging in to the fantasy sports app 128, the base fantasy module 122 may retrieve, at step 202, the fantasy roster created by the user, using the fantasy sports app 128. In one embodiment, the fantasy roster may be retrieved from the fantasy user database 120. For example, a fantasy roaster including Alshon Jeffery, Jalen Hurts, and DeSean Jackson from Philadelphia Eagles in the Draftkings app, is retrieved from the fantasy user database 120. The base fantasy module 122 may receive, at step 204, data related to the live event 102. In one embodiment, the data related to the live event 102, may be received from the sensor feeds 104. For example, the base fantasy module 122 receives data that Alshon Jeffery is playing in the live event 102. Based on the retrieved fantasy roster and received data related to the live event 102, the base fantasy module 122 may identify, at step 206, the players on the fantasy roster that are playing in the live event 102. In one example embodiment, the base fantasy module 122 may identify the players that are on offense in the live event 102. For example, Alshon Jeffery is a part of the fantasy roster and is playing on offense in the live event 102. Based on the identified players on the fantasy roster that are playing in the live event 102, the base fantasy module 122 may determine, at step 208, if a wager is available for the fantasy roster player. In one case, if a wager is available for the fantasy roster player, then the base fantasy module 122 may display available wagers to the user. For example, a wager of $100 is available for Alshon Jeffery, for scoring a touchdown with odds of 4/1. In another case, if no wager is available for the fantasy roster player, then the base fantasy module 122 may return to step 204, to continue receiving data related to the live event 102. Based on the determination that a wager is available for the fantasy roster player, then the base fantasy module 122, may display, at step 210, the available wagers to the user. In one embodiment, the available wagers may be displayed to the user on the mobile device 126. For example, the available wager of $100 for Alshon Jeffery, for scoring a touchdown with odds of 4/1, is displayed to the user Casey Huke. Further, the wager may be displayed in various forms such as, but not limiting to, the player with the available wager can be highlighted, all the players on offense can be highlighted (i.e. considering wager is available for players on offense), or the wagers can be displayed on the player's representation on the user's fantasy roster. In another embodiment, due to limited screen space on the mobile device 126, sub-menus may be displayed on the highlighted player with available wager or the highlighted players on offense, to allow for more wagers to be displayed. Further, the base fantasy module 122 may determine whether the user selects, at step 212, a wager to be placed. In one case, if the user selects a wager to be placed, then the base fantasy module 122 may trigger the wagering module 124. For example, the user selects the wager of $100 to be placed on Alshon Jeffery for scoring a touchdown. In another case, if no wager is selected by the user, then the base fantasy module 122 may return to step 204, to continue receiving data related to the live event 102. Based on the determination that the user selects the wager to be placed, the base fantasy module 122 may trigger, at step 214, the wagering module 124. The base fantasy module 122 may constantly monitor, at step 216, the live event 102, for completion. In one case, when the live event 102 is not concluded, the base fantasy module 122 may return to step 204, to continue receiving data related to the live event 102. In another case, when the live event 102 is concluded, then the program moves to step 220, to end the process. The base fantasy module 122 may also constantly monitor, at step 218 if the user logs-off from the app, during the live event 102. In one case, when the user does not logs-off from the fantasy sports app 128, then the base fantasy module 122 may return to step 204, to continue receiving data related to the live event 102. In another case, when the user logs-off from the app, then the program moves to step 220, to end the process. Thereafter, the program ends, at step 220.

FIG. 3 illustrates the wagering module. The wagering module 124 may receive a prompt, at step 300, from the base fantasy module 122. It can be noted that the wagering module 124 is triggered when the user wants to place a wager in the live event 102. For example, the wager may be available for Alshon Jeffery of $100 with odds at 4/1 for scoring a touchdown. After receiving the prompt from the base fantasy module 122, the wagering module 124 may constantly monitor, at step 302, the live event 102, for completion. In one case, when the live event 102 is concluded, then the wagering module 124 may proceed to compare the result of the live event 102 with the wager placed by the user. For example, the result of the live event 102 is that Alshon Jeffery scored a touchdown during the live event 102. In another case, when the live event 102 is not concluded, then the wagering module 124 may continue monitoring the live event 102 for completion. The wagering module 124 may compare, at step 304, the result of the live event 102 with the wagers placed by the user, to determine a result i.e. whether the user has won or lost. In this example, the result of the live event 102 indicates that Alshon Jeffery scored a touchdown, against the condition of wager of $100, placed on Alshon Jeffery for scoring a touchdown, are compared to determine the result of the wager i.e. a win for the user. Based on the comparison of the result of the live event 102 and the wagers placed by the user, the balance amount may be calculated, at step 306, for the user. For example, if Alshon Jeffrey of Philadelphia Eagles, playing 3rd quarter against the New England Patriots, scores a touchdown, then the user would make a profit of $400, as per the initial wager ($100) placed at odds of +400. Thus, the updated balance of the user (with an opening balance of $2000), after the completion of the live event 102, will be $2000+$400=$2400. Further, the wagering module 124 will update, at step 306, the account balance of the user who places the wager in the fantasy user database 120. In this example, after winning the wager of $100 placed at +400 odds, the updated balance of the user is $2400.

Thereafter, the process returns, at step 308, to the base fantasy module 122. The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for wagering on single plays inside of at least one live sporting event through a fantasy sports platform, the system comprising:
   a fantasy sports network configured to communicate with a user terminal configured to operate a graphical user interface application on a mobile device, wherein the mobile device is configured to display sub-menus based on limited screen space; and
   a connection to a wagering network wherein the system has a data feed from the at least one live sporting event comprising a feed from at least one sensor located at the at least one live sporting event, the fantasy sports network stores a roster of players including at least one player active in the at least one live sporting event in a database of the fantasy sports network, the roster of players is selected as a fantasy team in the fantasy sports network, the fantasy sports network is configured to determine that the at least one live sporting event is in progress and determine, from the data feed, that the at least one player is active, and, upon a determination that the at least one live sporting event is in progress, retrieve, from the database, the roster of players and, for each player on the roster of players, available wagering information for the respective player from the wagering network that comprises one or more available wagers from the wagering network for the at least one player, the one or more available wagers from the wagering network determined by a comparison of the at least one player on the roster of players with data received from the at least one live sporting event and data from the wagering network, and the fantasy sports network is configured to, upon a determination that a wager on the wagering network is available for a single play wager on the at least one player on the roster of players, provide a notification comprising the single play wager.

2. The system of claim 1, wherein the system is further configured to synchronize the roster of players in the fantasy sports network with the wagering network.

3. The system of claim 1, wherein the system is further configured to determine that the one or more available wagers are available through a comparison of at least one player on the roster of players, account data on the fantasy sports network, account data on the wagering network, and data from the at least one live sporting event.

4. The system of claim 3, wherein the system is further configured to determine that at least one player on the roster of players is active in the at least one live sporting event.

5. The system of claim 1, further comprising:
   a wagering module configured to be triggered upon a determination that at least one player on the roster of players is active in the at least one live sporting event.

6. The system of claim 1, wherein the system is further configured to provide, to the user terminal, a display of the one or more available wagers for the roster of players as an overlay on a display of at least one player on the roster of players.

7. The system of claim 1, wherein the system is further configured to provide, to the user terminal, a menu displayed with the one or more available wagers.

8. A method of wagering on single plays inside of one or more live sporting events through a fantasy sports platform, the method comprising executing on a processor of a user terminal the steps of:
   displaying, on a graphical user interface on a mobile device, a fantasy sports app, wherein the mobile device is configured to display sub-menus based on limited screen space;
   storing, in the fantasy sports app, a roster of players comprising a fantasy team associated with at least one fantasy sports event;
   retrieving and displaying one or more wagers accessible in the fantasy sports app, wherein the one or more wagers are real time single play wagers;
   based on the roster of players, displaying at least one player active in the one or more live sporting events, the at least one player selected from the roster of players selected as the fantasy team in the fantasy sports app;
   based on the data feed associated with the one or more live sporting events indicating that that at least one player is active in the one or more live sporting events and based on a comparison of the data feed to the roster of players, displaying a notification indicating that the one or more wagers are available to be placed on the at least one player of the roster of players active in the one or more live sporting events; and
   based on a user selection of the notification, displaying a curated list of the one or more wagers available to be placed on at least one player of the roster of players active in the one or more live sporting events.

9. The method of claim 8, further comprising:
displaying a menu of available wagers.

10. The method of claim 8, further comprising:
overlaying the one or more wagers on at least one representation of the at least one player of the roster of players active in the one or more live sporting events.

11. The method of claim 8, further comprising:
displaying a wagering module upon a determination that one or more players on the rosters of players is active in the one or more live sporting events.

12. A system for wagering on single plays inside of at least one live sporting event through a fantasy sports platform, comprising:
- a wagering network configured to communicate with a user terminal configured to operate a graphical user interface application on a mobile device based on one or more settlement options wherein the mobile device is configured to display sub-menus based on limited screen space;
- a connection to a fantasy sports network separate from the wagering network, wherein the system has a data feed from the at least one live sporting event comprising a feed from at least one sensor located at the at least one live sporting event, the wagering network is further configured to receive, from the fantasy sports network, and store a roster of players active in the at least one live sporting event, the roster of players selected as a fantasy team in the fantasy sports network, the wagering network is configured to determine that at least one live sporting event is in progress and perform real-time analysis of the data feed comprising at least determination of one or more active players, the wagering network is configured to compare the one or more active players to the roster of players and determine one or more available wagers from the wagering network on the one or more players that are on the roster of players provided through the fantasy sports network, the wagering network is configured to, upon determination that the one or more available wagers on the one or more players are available, provide a message to the fantasy sports network to cause a notification to be displayed on the user terminal regarding the one or more available wagers, said notification comprising a wager selection interface element.

13. The system of claim 12, wherein the system is further configured to determine that the one or more available wagers are available through a comparison of at least one player on the roster of players, account data on the fantasy sports network, account data on the wagering network, and data from the at least one live sporting event.

14. The system of claim 13, wherein the system is further configured to determine that at least one player on the roster of players is active in the at least one live sporting event.

15. The system of claim 12, further comprising:
- a wagering module configured to be triggered upon a determination that at least one player on the roster of players is active in the at least one live sporting event.

16. The system of claim 12, wherein the system is further configured to provide, to the user terminal, a display of the one or more available wagers for the roster of players as an overlay on a display of at least one player on the roster of players.

17. The system of claim 12, wherein the system is further configured to provide, to the user terminal, a menu displayed with the one or more available wagers.

* * * * *